(12) United States Patent
Li et al.

(10) Patent No.: US 8,538,908 B2
(45) Date of Patent: Sep. 17, 2013

(54) EFFICIENT SERVICE RULES CREATION THROUGH SUBJECTIVE LOGIC AND TEMPORAL PATTERN RECOGNITION

(75) Inventors: Zhiguo Li, Webster, NY (US); Rajinderjeet Singh Minhas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 308 days.

(21) Appl. No.: 13/014,019

(22) Filed: Jan. 26, 2011

(65) Prior Publication Data
US 2012/0191638 A1  Jul. 26, 2012

(51) Int. Cl.
G06F 9/44 (2006.01)
G06N 7/02 (2006.01)
G06N 7/06 (2006.01)

(52) U.S. Cl.
USPC .............................................. 706/52; 706/48

(58) Field of Classification Search
None
See application file for complete search history.

(56) References Cited

U.S. PATENT DOCUMENTS

| | | | |
|---|---|---|---|
| 7,720,787 B2 | 5/2010 | Pope et al. | |
| 7,843,585 B2 | 11/2010 | Nobutani | |
| 2002/0007237 A1* | 1/2002 | Phung et al. | 701/33 |
| 2002/0103776 A1 | 8/2002 | Bella et al. | |
| 2004/0181712 A1* | 9/2004 | Taniguchi et al. | 714/47 |
| 2007/0005523 A1* | 1/2007 | Maren | 706/14 |
| 2008/0059120 A1* | 3/2008 | Xiao et al. | 702/184 |
| 2008/0183704 A1* | 7/2008 | Miller et al. | 707/6 |

OTHER PUBLICATIONS

Conditional Reasoning with Subjective Logic, by Audun Josang, Dec. 2008.*
Artificial Reasoning with Subjective Logic, by Audun Josang, Dec. 1997.*
Fission of Opinions in Subjective Logic, by Audun Josang, Jul. 2009.*

* cited by examiner

*Primary Examiner* — Jeffrey A Gaffin
*Assistant Examiner* — Thomas Fink
(74) *Attorney, Agent, or Firm* — Kermit D. Lopez; Luis M. Ortiz; Kevin Soules

(57) ABSTRACT

A method for generating service rules corresponding to business data is disclosed. A plurality of business related data is gathered from various sources. The data is combined using a subjective logic technique. The data is then evaluated for temporal patterns. Finally a set of service rules corresponding to the combined business data are developed.

12 Claims, 6 Drawing Sheets

EFFICIENT SERVICE RULES CREATION THROUGH SUBJECTIVE LOGIC AND TEMPORAL PATTERN RECOGNITION

TECHNICAL FIELD

Embodiments are generally related to the field computer service techniques. Embodiments are also related to methods and systems for generating service rules. Embodiments are additionally related to the use of subjective logic and temporal pattern recognition to evaluate service data and generate service rules.

BACKGROUND OF THE INVENTION

In recent years, many businesses have identified post-sales service as an important driver of revenue and profitable growth. Post-sales revenue accounts for a significant portion of the total revenue stream of many companies. For example, after a piece of hardware, like a printer, is sold, significant revenue is generated in post-sales service of that hardware. As such, it has become increasingly important to devise efficient and cost effective methods and systems for providing post-sale service.

In order to reduce machine service hours and related service costs, remote service tools have been developed. Such remote service tools include on machine diagnostics and Eureka tips used by customer service engineers to service malfunctioning hardware. However, these and other similar tools have limited value in aiding service calls received by a technical support center. A review of such calls suggests only 40% can be resolved using these tools.

Additionally, most technical service companies maintain databases that track service data in a variety of ways. However, this data is often noisy, incomplete, or conflicting and therefore of little practical value. This is a result of the data being collected from different sources and by different means. Analyzing this data is difficult because it is difficult to confidently provide users with accurate results.

A classical or Bayesian probabilistic approach to combining information is not suitable for this problem. For example, the additivity principle of probability requires that the probability of mutually disjoint elements in a state space must add to one. This makes it cumbersome to express ignorance as a scalar probability value. For example, assume that a service call could have been caused by one of five different problems, but that nothing else is known about the situation. Then the statement "I don't know the cause of the service call" is translated in the classical probabilistic framework as "All five causes of the service call are equally likely". Such an approach provides an implicit expression of uncertainty or ignorance. This can be awkward to implement as it requires that a probability be assigned to every element of the state space.

Therefore, there is a need in the art for an improved method of utilizing a variety of data sources to develop accurate service rules and thereby reduce after sales service costs.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for a method for evaluating multiple data sources.

It is another aspect of the present invention to provide for an enhanced method for combining information from different sources to deliver reliable output using subjective logic.

It is another aspect of the present invention to provide for an enhanced method of generating service rules based on temporal pattern recognition.

It is yet another aspect of the present invention to provide an enhanced method and system for combining service data from multiple service data sources and generating accurate service rules.

The aforementioned aspects and other objectives and advantages can now be achieved as described herein. A method for developing service rules is disclosed. The disclosed approach is based on combining and analyzing multiple business data sources and generating service rules based on that data.

The disclosed approach involves gathering business related data from a plurality of sources. The data is then combined using a subjective logic procedure to produce a conclusion from the data along with a corresponding level of confidence in that result. The data is then evaluated for temporal patterns. Temporal patterns in the data along with the combined results are then used to generate service rules.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
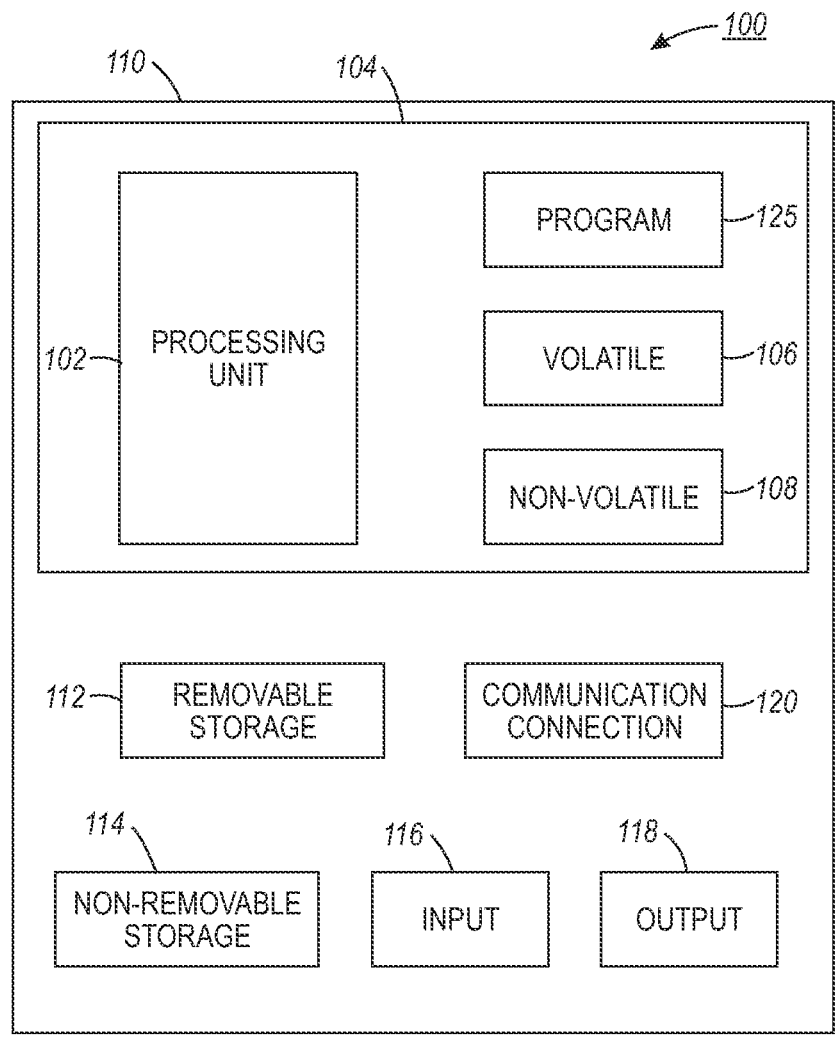
FIG. 1 depicts a block diagram of a computer system which is implemented in accordance with a preferred embodiment of the invention.

A block diagram of a computer system that executes programming for executing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of computer-readable media such as volatile memory 106 and non-volatile memory 108, removable storage 112 and non-removable storage 114. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data, including video frames Computer 110 may include or have access to a computing environment that includes input 116, output 118, and a communication connection 120. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 102 of computer 110. A hard drive, CD-ROM, and RAM are some examples of articles including a computer-readable medium.

To reduce the cost of servicing machines, companies have developed remote service tools to provide information regarding errors during runtime operation. In addition a machine user may contact a welcome center to provide a description of a machine error and request a remedy. Finally, a machine can be equipped with a remote data transmission capability to provide a temporal log of events, including errors, which occurred on the machine.

Figure 2:
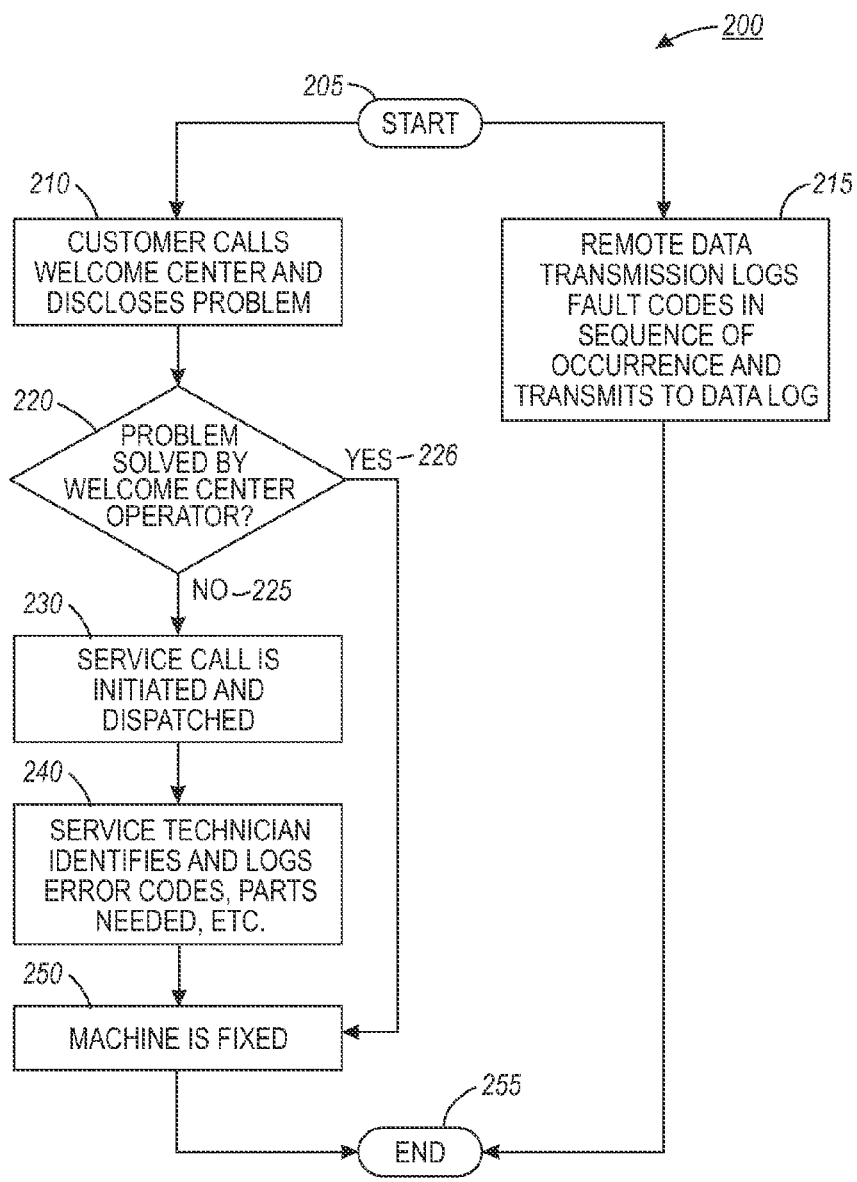
FIG. 2 depicts a flow chart illustrating logical operational steps in evaluating a service call in accordance with a preferred embodiment of the invention.

FIG. 2 illustrates a basic flow chart of error processing operations 200. At block 205 the method begins. A customer calls the welcome center and explains the problem with the machine, as illustrated at block 210. In addition, as soon as the method starts a sequenced log of all the events including fault codes is collected and transmitted from the machine, as shown at block 215.

After the customer calls the welcome center, the welcome center operator attempts to guide the customer in fixing the problem. This problem may relate to a malfunctioning hardware element, but could likewise apply to any problem being handled by an operator. The operator may or may not be able to fully understand the problem and suggest a solution from the customer's explanation of the error. Thus, as described by block 220, the problem may or may not be solved by the welcome center operator. All of the information provided to the welcome center operator is recorded in the Call Center Database (RCA). If the problem is solved as shown by block 226, the problem is fixed as shown at block 250. Otherwise, if the error is not corrected as illustrated at block 225, then at block 230 the operator initiates a service call and dispatches a service technician to the machine site.

The service technician attempts to fix the machine. At block 240, the service technician also identifies and logs any error codes associated with the problem, parts that are needed to fix the machine, or any other pertinent data collected from the machine. This data is recorded in the Field Work Support System Database (FWSS). The service technician then fixes the machine as shown at block 250 and the method ends at block 255.

The method 200 illustrates the common sources of machine related data. However, it is not uncommon for the data collected by the service technician (i.e. data codes, parts numbers, etc.) to be incomplete, or logged incorrectly. Likewise, the data provided by the machine user to the welcome center technician is often unreliable for a variety of reasons. Thus, the present invention provides an improved method for accurately interpreting overlapping data such as these.

Figure 3:
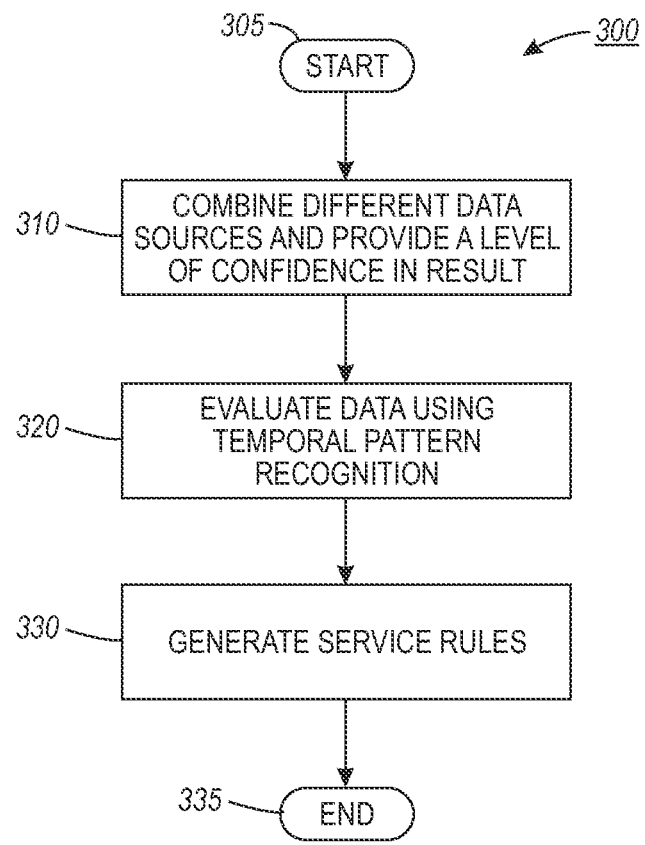
FIG. 3 depicts a flow chart illustrating basic operational steps in developing service rules in accordance with a preferred embodiment of the invention.

The method of creating service rules 300 is accomplished in three broad steps, as illustrated in FIG. 3. The generalized method is started at block 305. As shown at block 310, the data sources, including but not limited to those discussed in connection with FIG. 2, are combined using subjective logic and a level of confidence in the resulting data is provided. The details of step 310 are more thoroughly described herein. Next, at block 320 the data is evaluated using a temporal pattern recognition method also detailed below. Finally, as illustrated at block 330, a set of service rules is generated. The method then ends at block 335.

Step 310 of method 300 involves concatenating the data collected from a plurality of sources. Creating ensembles of partial noisy data from multiple sources can provide a more accurate and complete information source. Subjective logic techniques are used to combine the data sources and produce a confidence level in the data.

As described above, a classical probabilistic approach to combining information requires that a probability be assigned to every element of a state space. On the other hand, subjective logic allows ignorance to be modeled explicitly. This is achieved by relaxing the additivity principle by replacing the notion of probability with that of a belief mass function. More specifically, the sum belief of mutually disjoint elements in a state space should be less than or equal to one. The difference between one and the sum of beliefs is the explicit level of ignorance. In other words, in the subjective logic framework, the uncertainty about probability values is interpreted as ignorance.

In a subjective logic framework, an opinion is a composite function consisting of a belief vector and an uncertainty mass. The mathematical definition of a Belief Mass is as follows:

Let $X=\{x_i|i=1,\ldots k\}$ be a frame and let b be a function from X to [0, 1] representing belief masses over X satisfying $b(\emptyset)=0$ and $\Sigma b(x) \leq 1$. Then b is called a belief mass vector. The mathematical definition of an Uncertainty Mass is as follows:

Let $X=\{x_i|i=1,\ldots k\}$ be a frame with a belief vector b. Let u be a function from X to [0, 1] representing uncertainty over X satisfying $u+b(x)=1$. Then u is called an uncertainty mass.

As described above, a belief vector can be interpreted as a sub-additive probability function. Additivity is achieved by including the uncertainty mass. The uncertainty mass explicitly captures the notion of ignorance and makes it easy to specify beliefs and confidence in the various data sources that are to be combined.

Having definitions of the belief mass function (b), and the uncertainty mass function (u), an opinion can then be described by (b,u). Multiple sources of data or "opinions" relating to the root cause of a service call are provided as described according to FIG. 2 and FIG. 3. These opinions can be expressed as, for example, (b1, u1) and (b2, u2). Using subjective logic, these two opinions can be combined pair wise to express a combined opinion (b,u) which is given by equations (1) and (2) as follows:

$$b(x_i) = \frac{b_1(x_i)u_2 + b_2(x_i)u_1}{u_1 + u_2 - u_1 u_2} \quad (1)$$

if $u1 \neq 0$ or $u2 \neq 0$ $$u = \frac{u_1 u_2}{u_1 + u_2 - u_1 u_2} \quad (2)$$

Equations (1) and (2) highlight that the final result is more heavily influenced by the opinion about which there is less uncertainty. If there is no uncertainty about either of in the input opinions (i.e. u1=0 and u2=0), then the final belief can be expressed as the average of the individual beliefs.

Figure 4:
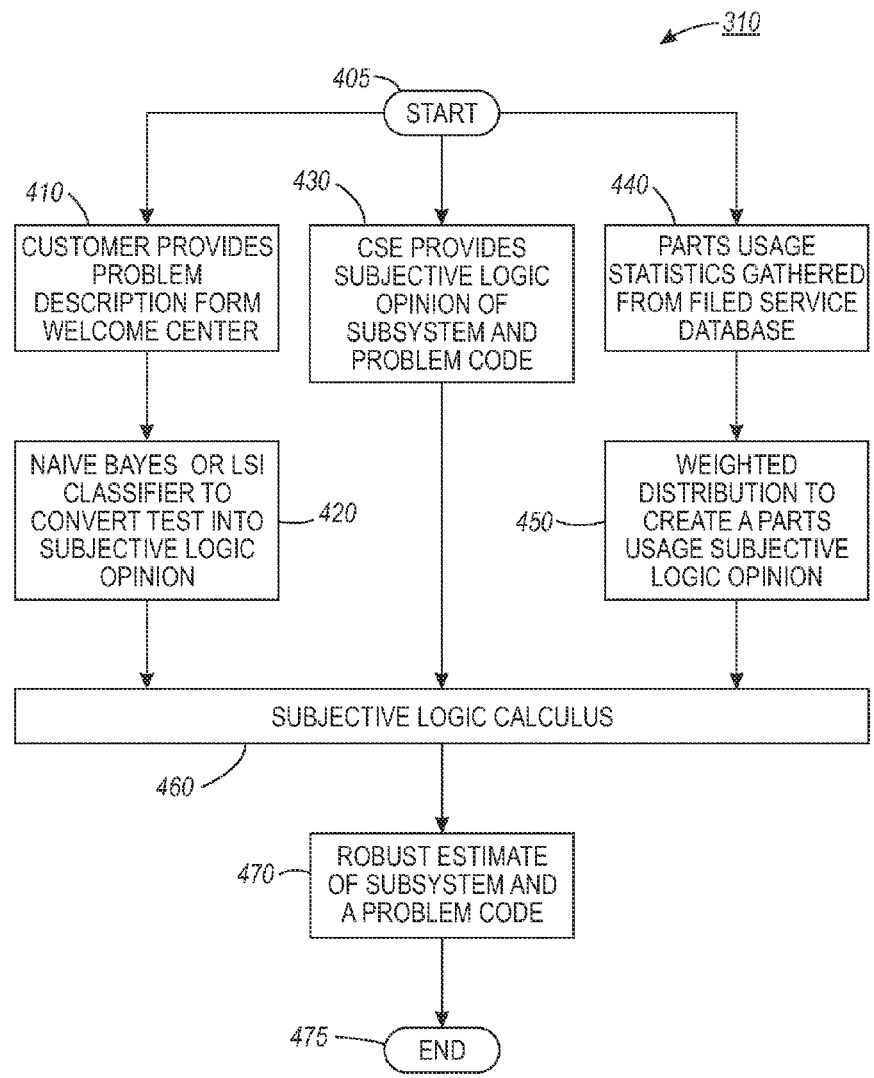
FIG. 4 depicts a flow chart of the logical operational steps in combining data from multiple sources in accordance with a preferred embodiment of the invention.

FIG. 4 is a flow chart illustrating the detailed steps involved in block 310 illustrated in FIG. 3. The method starts at block 405. Three separate steps are then initiated concurrently. At block 410, a customer calls the welcome center and provides the welcome center technician a description of the problem. The customer's description of the problem may provide additional information regarding the symptoms from the malfunctioning machine. The customer's description is entered into the call center database by the welcome center technician.

The text entries in the call center database will often include cryptic language, misspellings, abbreviations, and grammatical errors. A data mining algorithm is used to convert the textual description of the problem into a belief mass and uncertainty mass. In a preferred embodiment, a data mining algorithm such as the as Naïve Bayes or Latent Semantic Indexing can be trained to convert the textual description of the customer's problem into a belief and uncertainty mass assignment over a pre-defined list of possible problems. When the problem description text is very different from the text used to train the algorithm, the belief mass uncertainty will be correspondingly high. The textual input is thus converted into a subjective logic opinion as illustrated at block 420.

A customer service engineer may also provide a subjective logic opinion regarding the machine's malfunction based on the subsystem being used and/or the problem code provided by the machine, as shown at block 430. At block 460, the logic opinions developed at blocks 420 and 430 can be combined using a subjective logic calculus as described above to produce a better estimate of the actual problem.

Concurrently at block 440, parts usage and statistics are gathered from the FWSS database. Both the location and or subsystem of the underlying root cause can be used to diagnose the error. This data will correspond to the parts that were replaced by the customer service engineer. Each part is uniquely identified by a part number. Any part's location in the printer can be tracked using the part number.

The parts usage data available in the FWSS database is thus used to create a subjective logic opinion, as shown at block 450. The belief mass function is generated by using a weighted distribution of the parts used. For example, if the customer service engineer replaced three parts in the fusing subsystem and one part in the finisher, then b(Fuser)=0.75 and b(Finisher)=0.25. In practice, it is possible that some parts did not actually fail, but were replaced as part of a preventive maintenance policy. The historical ratio of preventive to failed parts replacement can be used to define the uncertainty mass function.

After the subjective logic opinion relating to parts usage is generated, as shown at block 450, it can be combined with the customer service engineer's subjective logic opinion generated at block 430 and the customer's description subjective logic opinion generated at block of 420 using a subjective logic calculus, as described by block 460. The output of block 460 is used to produce a robust estimate of the system and problem code as indicated by block 470. This output includes a subsystem code and a problem code. The method then ends at block 475.

The method illustrated in FIG. 3 also requires temporal data. Temporal data may be made available and stored in a database. In a preferred embodiment, temporal data can be collected by the machine and sent back to a database such as the Device Centric Services Remote Data Warehouse. The data is sent via an internet or network connection as shown in FIG. 1.

Figure 5:
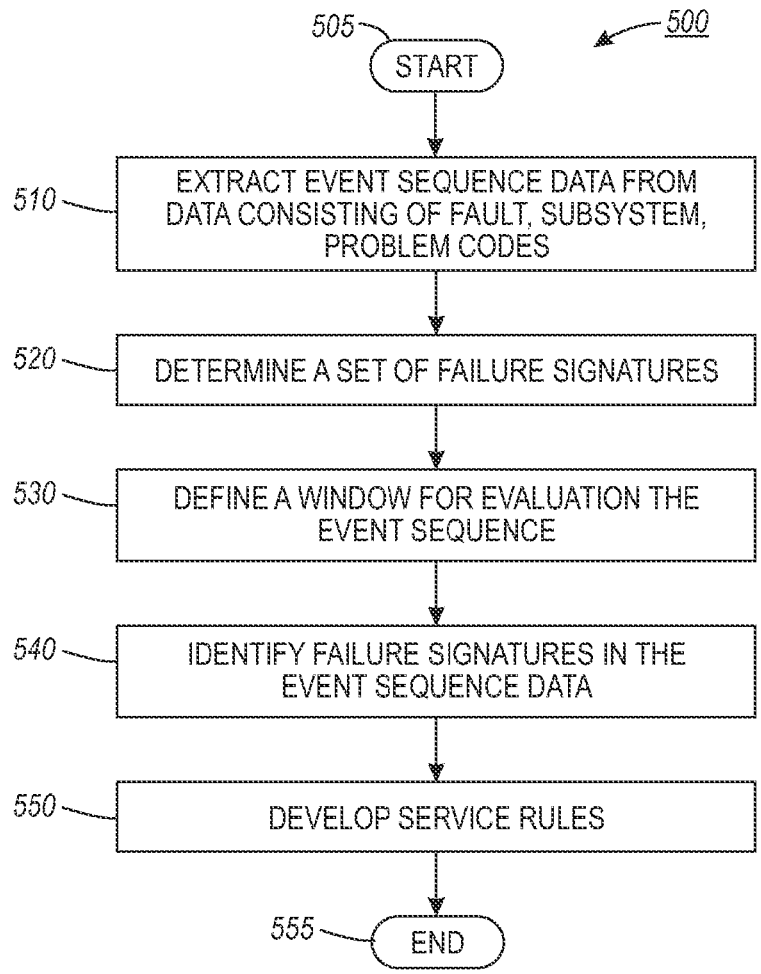
FIG. 5 depicts a flow chart of the logical operational steps in evaluating data using temporal pattern recognition in accordance with a preferred embodiment of the present invention.

FIG. 5 illustrates a flow chart with the detailed steps involved in method step 320. The method starts at block 505. Next, at block 510, event sequence data is extracted from a log file. The malfunctioning machine is configured to record fault codes and corresponding time information. In addition, time information relating to service call types (subsystem codes and/or problem codes) is recorded. The event sequence is a serial of these events marked with their occurrence time. The fault codes and service calls constitute the events. Formally an event sequence is defined as follows:

An event sequence S on a set of event types, $\epsilon$, is a triple (s, Ts, Te), where Ts and Te are the starting time and ending time respectively, and s=<(E1, t1), (E2, t2), ... (En, tn). This is an ordered sequence of events such that $E_i \in \epsilon$ for all i=1,2, ... n and ti's are occurrence times of corresponding events with Ts≤t1≤ ... ≤tn≤Te.

Usually, there are a large number of events in an event sequence. This can make it very difficult to extract useful information from the raw data. Thus, in practice only temporally proximate patterned events are considered. An episode is defined as a type of temporal pattern. In other words, episodes are collections of events occurring frequently close to each other in time. In general, episodes are partially ordered sets of events. So one might, for example, observe that when event A and event B occur, in either order, event C occurs soon thereafter.

At block 520, the next step of method 500 is described wherein a set of failure signatures is determined. A failure signature is a special type of episode. Unlike an episode generally, a failure signature is associated with a key event; a failure. For example, a failure signature could be defined as follows: $\mu$=({A, B, K}, {A, B<K} where {A, B, K} means the signature $\mu$ consists of three events A, B and K, and {A, B<K} means events A and B always occur before K in $\mu$, while the order between A and B is not specified. This temporal pattern is ended with a failure event K, so we could view it as a potential signature of failure K. In a preferred embodiment of the invention, experts in a given domain would evaluate the failure signature to determine if it is useful or not.

Figure 6:
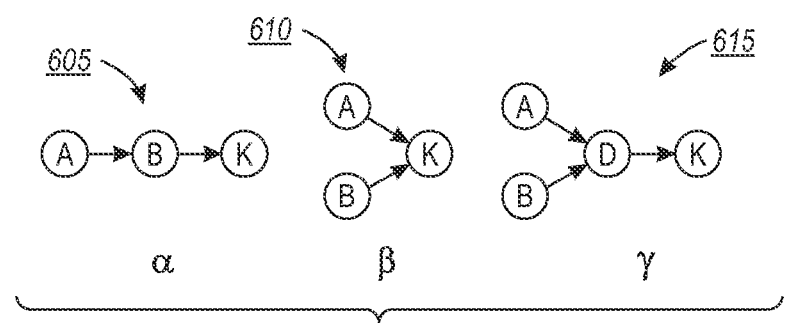
FIG. 6 depicts serial, parallel, and composite failure signatures in accordance with a preferred embodiment of the present invention.

There are three types of failure signatures illustrated in FIG. 6, serial failure signature 605, parallel failure signature 610, and composite failure signature 615. A serial failure signature 605 is defined by the order relation of the pseudo trigger events A and B. In a serial failure signature, that order is a total order and does not change before failure event K. In a parallel failure signature 610, the order to trigger events A and B is not equal for all A and B. Thus, any combination of trigger events A and B before failure event K is allowed. Finally, a composite failure signature 615 occurs when two trigger events A and B lead to trigger event D and finally to failure K. Note the composite signature could be constructed as a combination of serial and parallel trigger events.

Next as shown at block 530, a window is defined for evaluating the event sequence. Notice that the failure signatures described above generally describe a temporally relevant order of events. However, that description does not include any explanation of the actual time between events. It is therefore necessary to define a window of time wherein all the events in a trigger signature occur to establish a meaningful temporal pattern.

A window is formally defined as an event sequence $W=(T_{ws}, T_{we}, S_w)$, where $T_{ws}, T_{we}$ are the starting and ending times of a window respectively and we have $T_s \leq T_{ws} < T_{we} \leq T_e$. $S_w$ consists of those pairs $(E_i, t_i)$ from S where $T_{ws} \leq t_i < T_{we}$. For example, the window from $T_{ws}=10$ to $T_{we}=30$ which covers the events of $W=e_i, \ldots, e_j$ is denoted as (10, 30, W). The width of the window W is defined as width $(W)=T_{we}-T_w=w$. Given an event sequence S and an integer w, we denote W(S,w,K) as the set of all windows covering failure event K on S of size w.

Now if a failure signature $\phi$ occurs in window W, then $W \supset \phi$. The frequency of $\phi$ in the set W(S,w,K) of all windows covering K on S of size w is given by equation (3)

$$fr(\varphi, S, w, K) = \frac{|W \in W(S, w, K)|W \supset \varphi|}{|W(S, w, K)|} \quad (3)$$

where the symbol |●| means the number of the corresponding objects. Given a threshold min_fr for the frequency, a given failure signature is frequent if $fr(\phi,S,w,K) \geq$ min_fr. If $\phi$ is frequent, then all its sub-signatures are frequent.

From a statistical point of view, for a given failure signature, put a window of size w on a given event log. If the window covers the failure event, then the frequency of the failure signature is the probability that the window will also cover the whole failure signature. A larger frequency means the pseudo trigger events in the fault signature are more likely to happen before failure event K in the given window size.

Finally, at block 540, the above definitions are used to identify relevant failure signatures from the event sequence log. Detailed steps for this method step are described below and in FIG. 7. After the failure signatures are identified they are used to develop a set of service rules as indicated at block 550. At block 555 the method ends.

Figure 7:
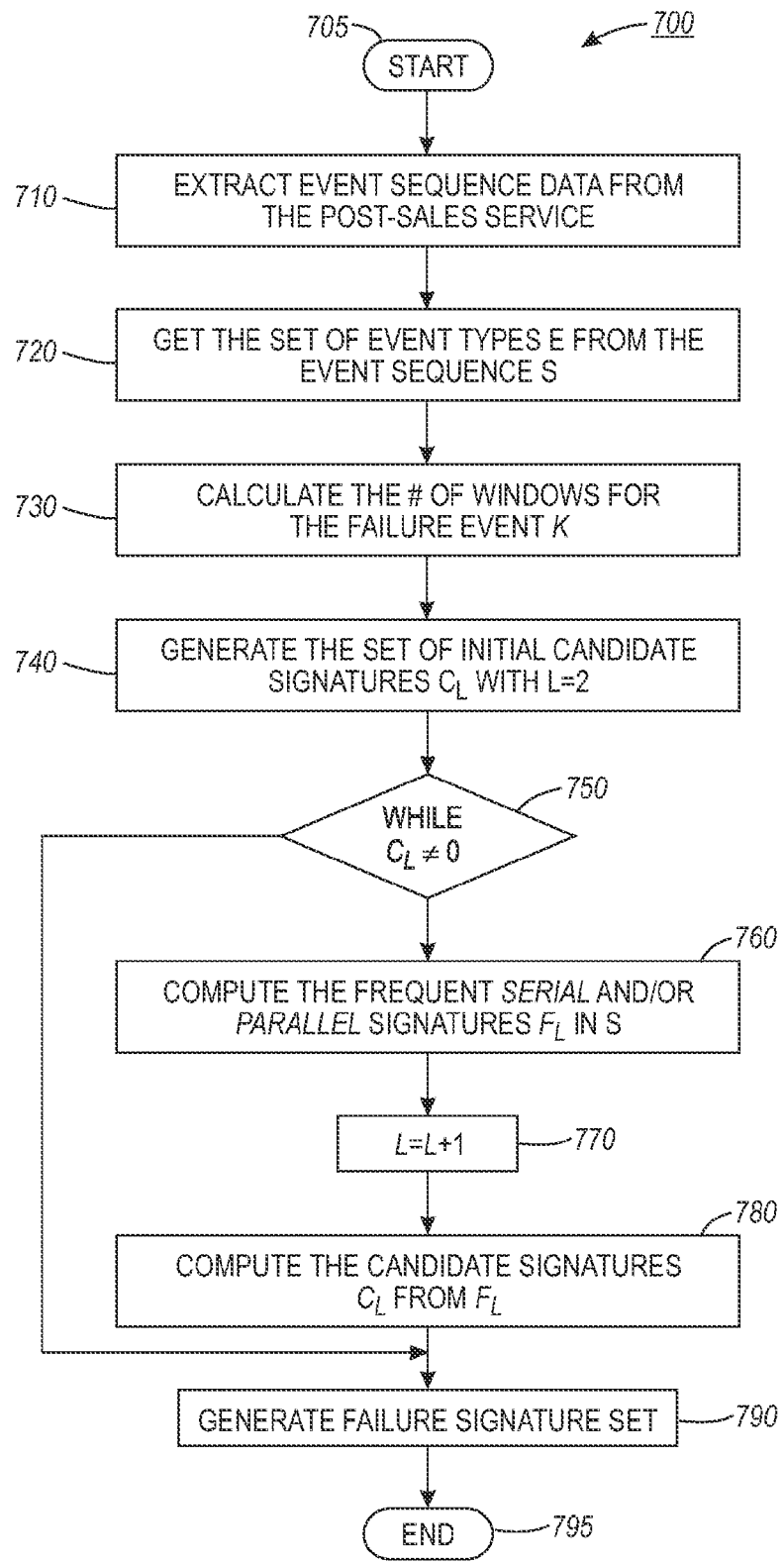
FIG. 7 depicts a flow chart of the logical operational steps in generating a service rule in accordance with a preferred embodiment of the present invention.

FIG. 7 is a flow chart illustrating detailed steps in identifying a failure signature. This method is broadly described by block 540 in FIG. 5. Generally, the method of identifying failure signatures involves sliding a window of a given width along a timeline established by the event/error log and counting the number of windows that cover the failure signature. If the frequency of the failure signature is larger than a threshold frequency, then it is classified as a frequent failure signature.

The method 700 begins at block 705. Next, at block 710, event sequence data is extracted from the aforementioned data sources. The data is processed to remove any useless or wrong information. In addition to event sequence data, a failure event, frequency threshold, and window width must be provided. Block 720 illustrates that the set of event types from the event sequence are determined. The number of windows of a given size is then calculated for a failure event, as shown at block 730. A set of initial candidate signatures are then determined at block 740. The variable "L" represents the length of the candidate signature. The smallest value of L is 2 as illustrated in FIG. 7 since the failure signatures should have at least two event types. However, one skilled in the art will appreciate that the length of the failure signature will vary depending on circumstance.

An iterative process is then used to generate the failure signature set. At block 750, the set of initial candidate signatures is checked to make sure it contains at least one candidate failure signature. Next at block 760, the serial and/or parallel signatures are computed for the event sequence. The variable L is then increased at block 770 and then the candidate signatures are computed using the frequency signatures, computed at block 760, as shown at block 780. The method steps are then repeated while the initial candidate signatures are not zero, as shown at block 750. The iterative steps are used to generate a failure signature set described at block 790. The method ends at block 795.

As shown at block 550 of FIG. 5, the goal of discovering the failure signatures in the event sequence data is to identify the trigger events for failures. Thus, the failure signature set generated at step 790 of FIG. 7 can then be used to diagnose the occurrence of a failure event. It can also be used to predict the occurrence of failure events. Thus, service rules are developed which relate to the identified failure signatures.

For example, if events A and B are observed then the failure event K will happen within a specified time interval with a certain percent confidence. To predict the occurrence of the failure event K, the service rules are searched for corresponding triggering events. To generate the service rules, the following must be defined: If a failure signature $\phi$ occurs in window W, then $W \supset \phi$. The failure signature is written as $\phi=\{T_r, K\}$, where $T_r$ stands for the set of the trigger events in this failure signature. Define the confidence of the following prediction rule as follows:

IF the set of trigger events $T_r$ occurs in the system
THEN the failure event K will occur
WITHIN w
WITH confidence (c %),
which is generated based on $\phi$ according to equation (4) as $$\text{Confidence}(\varphi, S, w, K) = \frac{|W \in W(S, w, K)|W \supset \varphi|}{|W \in W(S, w)|W \supset T_r|} \quad (4)$$

where the symbol |●| means the number of the corresponding objects.

While the present invention has been particularly shown and described with reference to a preferred embodiment, it will be understood by those skilled in the art that various changes in form and detail may be made therein without departing from the spirit and scope of the invention. It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for developing service rules, said method comprising:
    gathering a plurality of business data sets comprising at least two of a textual description of a problem provided to a support center, a subjective logic opinion and associated problem code provided by a service technician, and error data provided by a machine;
    determining a belief vector and uncertainty mass for each of said plurality of business data sets;
    evaluating the combination of each belief vector and each uncertainty mass associated with each of said business data sets with a subjective logic technique;
    producing a level of confidence based on said evaluation of the combination of each belief vector and each uncertainty mass associated with each of said business data sets with a subjective logic technique, wherein said level of confidence is indicative of a confidence in the reliability of said plurality of business data sets;
evaluating said combined business data for temporal patterns therein; and
generating a service rule corresponding to said produced level of confidence in said business data and said temporal error patterns.

2. The method of claim 1 wherein evaluating said combined business data for temporal patterns therein, further comprises:
determining an event sequence;
defining a window associated with said event sequence;
evaluating said event sequence for a failure signature; and
determining the frequency said window covers said failure signature.

3. The method of claim 2 wherein said failure signature comprises at least one of the following types of failure signatures:
a serial failure signature;
a parallel failure signature; or
a composite failure signature.

4. The method of claim 2 further comprising utilizing said failure signature to generate said service rule to predict an occurrence of a failure event.

5. A method for developing service rules comprising:
gathering a plurality of business data sets comprising machine service data from a plurality of sources at least two of a textual description of a problem provided to a support center, a subjective logic opinion and associated problem code provided by a service technician, and error data provided by a machine;
combining said business data sources;
producing a level of confidence in said combined business data wherein said level of confidence is indicative of a confidence in the reliability of said plurality of business data sets by:
determining a belief vector and an uncertainty mass for each of said business data sets; and
evaluating the combination of each belief vector and each uncertainty mass associated with each of said business data sets with a subjective logic technique;
evaluating said combined business data for temporal patterns by:
determining an event sequence;
defining a window associated with said event sequence;
evaluating said event sequence for a failure signature; and
determining the frequency said window covers said failure signature; and
generating a service rule corresponding to said combined business data and said temporal error patterns.

6. The method of claim 5 wherein said failure signature comprises at least one of the following types of failure signatures:
a serial failure signature;
a parallel failure signature; or
a composite failure signature.

7. The method of claim 5 further comprising utilizing said failure signature to generate said plurality of service rules to predict the occurrence of a failure event.

8. The method of claim 5 wherein evaluating each of said business data set's belief vector and uncertainty mass with said subjective logic technique produces an estimate of a system code and a problem code.

9. A system for developing service rules, comprising:
a processor;
a data bus coupled to said processor; and
a computer-usable medium embodying computer code, said computer-usable medium being coupled to said data bus, said computer program code comprising instructions executable by said processor and configured for:
gathering a plurality of business data sets comprising at least two of a textual description of a problem provided to a support center, a subjective logic opinion and associated problem code provided by a service technician, and error data provided by a machine;
determining a belief vector and uncertainty mass for each of said plurality of business data sets;
evaluating the combination of each belief vector and each uncertainty mass associated with each of said business data sets with a subjective logic technique;
producing a level of confidence based on said evaluation of the combination of each belief vector and each uncertainty mass associated with each of said business data sets with a subjective logic technique, wherein said level of confidence is indicative of a confidence in the reliability of said plurality of business data sets;
evaluating said combined business data for temporal patterns therein; and
generating a service rule corresponding to said produced level of confidence in said business data and said temporal error patterns.

10. The system of claim 9 wherein said instructions are further configured for:
determining an event sequence;
defining a window associated with said event sequence;
evaluating said event sequence for a failure signature; and
determining the frequency said window covers said failure signature.

11. The system of claim 10 wherein said failure signature comprises at least one of the following types of failure signatures:
a serial failure signature;
a parallel failure signature; or
a composite failure signature.

12. The system of claim 10 wherein said failure signature is utilized to generate a plurality of service rules to predict the occurrence of a failure event.

* * * * *